June 20, 1961 P. S. HOPPER 2,988,878
FUEL NOZZLE FOR BYPASS ENGINE
Filed July 14, 1958
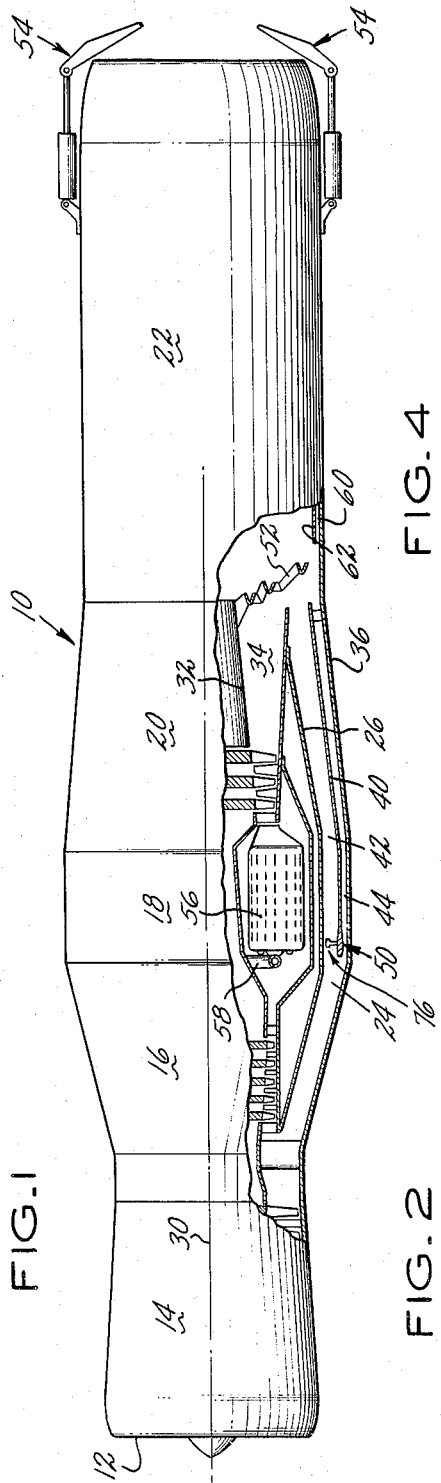
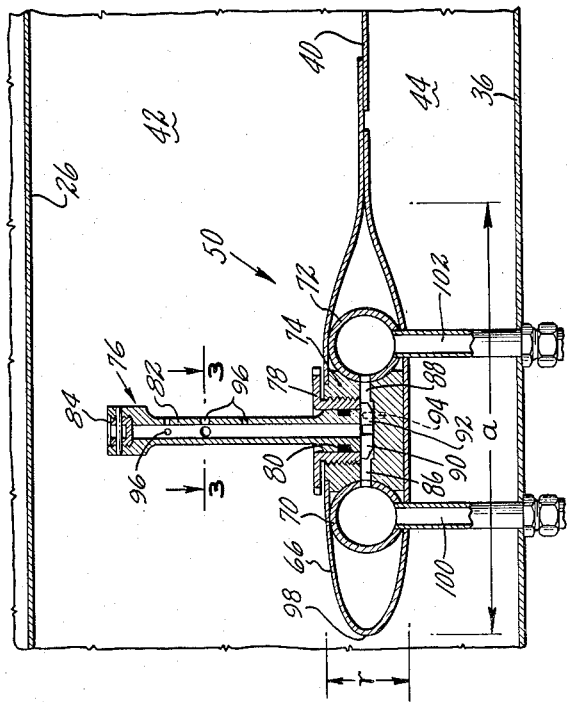
INVENTOR
PHILIP S. HOPPER
BY Vernon F. Hauschild
ATTORNEY

United States Patent Office 2,988,878
Patented June 20, 1961

2,988,878
FUEL NOZZLE FOR BYPASS ENGINE
Philip S. Hopper, Manchester, Conn., assignor to United Aircraft Corporation, East Hartford, Conn., a corporation of Delaware
Filed July 14, 1958, Ser. No. 748,202
6 Claims. (Cl. 60—35.6)

This invention relates to turbofan type engines with afterburners or turbo ramjet engines and more particularly to apparatus for introducing fuel into the engine for combustion in the afterburner.

It is an object of this invention to teach fuel injection apparatus comprising a fuel manifold positioned at the upstream end of a passage defining wall member, which manifold is enveloped within an airfoil-shaped ring member and carries fuel spray bars which project radially into the passage defined in part by the manifold carrying wall member to release a pattern of atomized fuel. The fuel is released at the passage inlet or upstream end and substantially at the radial center of the passage to eliminate raw fuel deposits on the passage walls.

It is a further object of this invention to teach fuel injection apparatus which positions the upstream end of a passage defining member.

It is a further object of this invention to teach fuel injection apparatus in which fuel is injected from radially directed fuel injecting apparatus which project from and receive fuel from a fuel manifold ring which is positioned at the upstream end of a shell of circular cross section, which shell is positioned concentrically between and coacts with annular passage walls to define a fuel-air mixing passage into which the fuel is injected and to further define a fuel-free cooling air passage adjacent but separate from said fuel-air mixing passage.

Other objects and advantages will be apparent from the specification and claims, and from the accompanying drawings which illustrate an embodiment of the invention.

FIG. 1 is a side view, partially broken away of a turbofan engine with afterburner illustrating my invention.

FIG. 2 is an enlarged partial view of a portion of my invention shown generally in FIG. 1.

FIG. 3 is an enlarged cross-sectional view taken along line 3—3 of FIG. 2.

FIG. 4 is a side view, partially in section of a second embodiment of the fuel injecting means used in my fuel injection apparatus.

FIG. 5 is a rear view of the embodiment shown in FIG. 4.

Referring to FIG. 1 we see afterburner turbofan engine 10 of the aircraft type which comprises air inlet section 12, engine fan section 14, compressor section 16, burner section 18, turbine section 20, afterburner section 22, and bypass duct or passage section 24. Inner or first engine case 26, which is of circular cross section and concentric about engine axis 30 envelops compressor section 16, burner section 18 and turbine section 20 and coacts with stationary inner body 32, which is preferably of circular cross section and concentric about axis 30 and diverging in a downstream direction, to form annular exhaust gas passage 34 through which the exhaust gases which pass through compressor section 16, burner section 18 and turbine section 20 are directed to afterburner section 22. Outer or second engine case 36 is also of circular cross section and concentric about axis 30 and envelops engine fan 14, engine inner case 26 and afterburner section 22. Engine inner case 26 and engine outer case 36 coact to define annular bypass duct or passage 24 which is in communication with fan section 14 at its upstream end and afterburner section 22 at its downstream end. A fuel baffle or wall 40, which is preferably a shell of circular cross section and concentric about axis 30 is positioned between engine inner case 26 and engine outer case 36 and extends axially therealong in bypass passage 24 to coact with engine inner duct 26 to define an annular fuel-air mixture passage 42 therebetween which is convergent in a downstream direction at its upstream end and to also coact with engine outer case 36 to define an annular cooling air passage 44 adjacent and external of fuel-air mixing passage 42. Passages 42 and 44 communicate with bypass passage 24 at their upstream ends and with afterburner section 22 at their downstream ends. My fuel injection apparatus 50 is positioned at the upstream end of fuel baffle 40 in a fashion to be described more completely hereinafter. Flameholder unit 52, which is of the type described more fully in U.S. application Serial No. 695,566 is positioned at and carried by the after end of inner body 32 and extends outwardly therefrom to intersect the exhaust gases being discharged through exhaust gas passage 34 and the fuel-air mixture being discharged from fuel-air mixture passage 42, to establish a stagnant region and combustion zone downstream thereof to support the combustion of the fuel-air mixture therein. The fact that flameholder unit 52 tilts rearwardly or downstream as it projects radially outwardly serves to permit ignition of the fuel-air mixture in the relatively warm area downstream of passage 34 by use of any convenient means such as the hot-streak ignitor fully described in U.S. Patent No. 2,829,489, and the burning fuel-air mixture will pass radially outward along flameholder unit 52 to ignite and assist in supporting the combustion of the relatively cold fuel-air mixture located downstream of passage 42.

Afterburner 22 is shown to have an exhaust nozzle unit 54 at the downstream end thereof to vary the area of the outlet through which the afterburner exhaust gases are discharged to atmosphere to generate thrust. Exhaust nozzle unit 54 may be of any conventional type, one of which is fully described in U.S. Patent Nos. 2,836,034 and 2,815,643.

In operation, air enters the inlet section 12 of turbofan engine 10 to be compressed in fan section 14 thereof. The air which is discharged from fan section 14 is then directed to afterburner section 22 by one of two possible routes or paths. In following the first of these routes, a portion of the air from fan section 14 passes through and is further compressed by compressor section 16, is then heated in passing through burner section 18 due to the combustion which is taking place in combustion chambers 56, which receive fuel through fuel nozzles attached to fuel manifold 58, and then passes through turbine section 20 wherein energy is extracted therefrom to drive fan 14 and compressor 16 and then passes through exhaust gas passage 34 and across flameholder unit 52 into afterburner 22 for further combustion therein. In following the second route, the remaining air from fan 14 will pass through bypass passage 24 and be intercepted by airfoil-shaped fuel injection apparatus 50 and diverted either into fuel-air mixing passage 42 or cooling air passage 44. The air which entered fuel-air mixture passage 42 mixes with atomized fuel which is discharged from fuel injection apparatus 50 into the upstream end of passage 42, preferably at several points throughout the circumferential periphery thereof, and at the substantially radial midpoint thereof to eliminate raw fuel deposits on fuel baffle 40 and inner engine case 26 and this fuel-air mixture passes across flameholder unit 52 for combustion in afterburner 22. This passage radial midpoint injection is of importance with regard to raw fuel deposit elimination since passage 42 is convergent in a downstream direction at its upstream end. The cooling air which passes through passage 44 passes generally radially external of fuel-air mixing passage 42 and a portion of this air enters afterburner cooling air passage 60, which is generally similar to the cooling shroud taught in U.S. application Serial No. 483,204, between engine outer case 36 and afterburner cooling baffle 62.

My fuel injection apparatus 50 is shown in greater particularity in FIG. 2. A hollow ring member 66 is attached by brazing or any other convenient means to the upstream end of fuel baffle 40 and projects upstream thereof to present an airfoil shape to the air of bypass duct 24 entering passages 42 and 44. Hollow ring member 66 is concentric about axis 30 and has axial dimension "$a$" which is elongated and large relative to its radial dimension "$r$," this dimension relation holding air blockage thereby to a minimum. Two axially spaced fuel manifold rings 70 and 72 are enveloped by hollow ring member 66. Fuel manifold rings 70 and 72 may act individually, in sequence, or jointly to give desired fuel flow flexibility. A plurality of connecting members 74 are located within hollow ring member 66, preferably at equally spaced circumferential positions thereabout, and attached by welding or other means to fuel manifold rings 70 and 72 and are further attached by welding or other means to hollow ring member 66. Between connecting member 74 hollow ring members 66 comprises a smooth-surfaced hollow airfoil shape of the contour generally illustrated in FIG. 2. Fuel spray member 76 is connected to each connecting member 74 by collar member 78 which screws into connecting member 74, by means of cooperating threads, to hold fuel spray member 76 in position and to compress ring seal 80 to prevent fuel leakage between fuel spray member 76 and collar 78. Obviously, a two-stage fuel injection system could be achieved by connecting a series of axially spaced fuel spray members to each fuel manifold ring 70 and 72. Fuel spray member 76, as shown in FIG. 2, comprises a radially extending hollow bar 82 which is plugged at its outer end by insert unit 84 and which communicates with fuel manifold rings 70 and 72 through passages 86 and 88, which align with passages 90 and 92 of fuel spray member 76. Dowel pin 94 engages recesses in connecting member 74 and fuel spray member 76 to prevent relative rotation therebetween. A plurality of apertures or perforations 96 pass through the walls of fuel spray member 76 and are positioned so as to direct fuel which passes therethrough in atomized form into the inlet end of fuel-air mixture passage 42 but somewhat downstream of the extreme upstream tip 98 thereof and so as to provide maximum radial and circumferential atomized fuel distribution yet avoiding raw fuel deposit on wall parts, preferably at the radial midpoint of passage 42. Fuel lines 100 and 102 are connected to fuel manifold rings 70 and 72, respectively, and also to engine outer case 36 and serve both to transmit fuel from any pressurized source, not shown, to fuel manifold rings 70 and 72 and also to position fuel manifold rings 70 and 72 and hence the upstream end of fuel baffle 40 with respect to engine outer case 36.

A second embodiment of my fuel spray means 76 is shown in FIGS. 4 and 5 in which a radially extending hollow bar 104 extends from connecting members 74 of the type shown in FIG. 2 and communicates with the fuel manifold rings 70 and 72 and further communicates with a fuel nozzle 106 which has a plurality of axially downstream directed apertures or an atomizing orifice 108 therein. For raw fuel deposit prohibiting purposes, nozzle 106 is placed substantially at the radial midpoint of passage 42 at the upstream end thereof.

While my invention has been described in connection with an afterburner turbofan engine, it will be obvious to those skilled in the art that it is equally applicable to other powerplants, such as an afterburner turbo-ramjet engine and in either, the advantage of an elongated fuel-air mixing passage, as well as a fuel-free cooling air passage external thereof is achieved. This is particularly important at high Mach number, high altitude flight in which the bulk of the engine air is passed through bypass passage 24 so that the bulk of the fuel-air mixture to be burned in afterburner 22 will come from passage 42.

It is to be understood that the invention is not limited to the specific embodiments herein illustrated and described but may be used in other ways without departure from its spirit as defined by the following claims.

I claim:

1. Fuel injection apparatus comprising an annular passage defined between two wall members of substantially circular cross section which are concentric about an axis, means to pass gas through said passage, a hollow ring member attached to, coaxial with and radially aligned with the upstream end of one of said wall members and shaped to present an airfoil to the gas entering said passage, a fuel manifold ring enveloped within said ring member, at least one fuel spray member projecting from said fuel manifold ring into said passage and presenting an airfoil shape to the gas entering said passage and having at least one aperture therein positioned to release fuel at the inlet and substantially the radial center of said passage.

2. Fuel injection apparatus comprising an annular chamber defined between two wall members of substantially circular cross section and which are concentric about an axis, a third wall of substantially circular cross section positioned between said wall members and coaxial therewith and extending therealong to split said annular chamber into inner and outer annular passages, means to pass gas through said passages, a hollow ring member attached to, coaxial with and radially aligned with the upstream end of said third wall so that said third wall extends downstream thereof and shaped to present an airfoil to the gas entering said passages, a fuel manifold ring enveloped within said ring member, at least one fuel spray member projecting from said fuel manifold ring into one of said passages and presenting an airfoil shape to the gas entering said passage and having apertures therein positioned to release fuel at the inlet and substantially the radial center of said passage.

3. A turbofan engine having an axis and comprising an engine fan section, a compressor, a burner section, a turbine section and an afterburner section at the downstream end thereof, a first engine case of substantially circular cross section enveloping said compressor, burner section and turbine section, a second engine case of substantially circular cross section enveloping said fan section, first engine case and afterburner section and coacting with said first engine case to define an annular bypass passage therebetween connecting said fan section to said afterburner section, a fuel wall of substantially circular cross section concentric with and positioned between said first and second engine cases and coacting with said first and second engine cases to define an annular fuel-air mixing passage and an annular cooling air passage, respectively, each communicating at its upstream end with said bypass passage and at its downstream end with said afterburner section, a hollow ring member attached to, coaxial with and radially aligned with the upstream end of said fuel wall so that said fuel wall extends downstream therefrom and shaped to present an airfoil to the air entering said passages, a fuel manifold ring enveloped within said ring member, at least one fuel spray member projecting from said fuel manifold ring into said fuel-air mixing passage and presenting an airfoil shape to the air entering said passage and having apertures therein positioned to release fuel at the inlet and substantially the radial center of said fuel-air mixing passage.

4. A turbofan engine having an axis and comprising an engine fan section, a compressor, a burner section, a turbine section and an afterburner section at the downstream end thereof, a stationary inner body of substantially circular cross section and concentric about said axis projecting rearwardly from said turbine to said afterburner section, a first engine case of substantially circular cross section enveloping said compressor, burner section and turbine section and extending rearwardly to said afterburner section to coact with said inner body to define an annular exhaust gas passage to direct the exhaust gas from said compressor, burner and turbine sections to said afterburner section, a second engine case of substantially circular cross section enveloping said fan section, first engine case and afterburner section and coacting with said first engine case to define an annular bypass passage therebetween connecting said fan section to said afterburner section, a fuel wall of substantially circular cross section concentric with and positioned between said first and second engine cases and coacting with said first and second engine cases to define an annular fuel-air mixing passage and an annular cooling air passage, respectively, each communicating at its upstream end with said bypass passage and at its downstream end with said afterburner section, said annular fuel-air mixing passage being convergent in a downstream direction adjacent its upstream end, a hollow ring member attached to, coaxial with and radially aligned with the upstream end of said fuel wall so that said fuel wall extends downstream therefrom and shaped to present an airfoil having an elongated axial dimension and a relatively small radial dimension to the air entering said passages, two axially spaced fuel manifold rings enveloped within said ring member, a plurality of connecting members in said hollow ring member positioned between and connected to said fuel manifold rings and said hollow ring member, a fuel spray member projecting from each of said connecting members into said fuel-air mixing passage and presenting an airfoil shape to the air entering said passage and having apertures therein communicating with said fuel manifold rings and positioned to release fuel at the inlet and substantially the radial center of said fuel-air mixing passage.

5. A turbofan engine having an axis and comprising an engine fan section, a compressor, a burner section, a turbine section and an afterburner section at the downstream end thereof, a stationary inner body of substantially circular cross section and concentric about said axis projecting rearwardly from said turbine to said afterburner section, a first engine case of substantially circular cross section enveloping said compressor, burner section and turbine section and extending rearwardly to said afterburner section to coact with said inner body to define an annular exhaust gas passage to direct the exhaust gas from said compressor, burner and turbine sections to said afterburner section, a second engine case of substantially circular cross section enveloping said fan section, first engine case and afterburner section and coacting with said first engine case to define an annular bypass passage therebetween connecting said fan section to said afterburner section, a fuel wall of substantially circular cross section concentric with and positioned between said first and second engine cases and coacting with said first and second engine cases to define an annular fuel-air mixing passage and an annular cooling air passage, respectively, each communicating at its upstream end with said bypass passage and at its downstream end with said afterburner section, a hollow ring member attached to, coaxial with and radially aligned with the upstream end of said fuel wall so that said fuel wall extends downstream therefrom and shaped to present an airfoil having an elongated axial dimension and a relatively small radial dimension to the air entering said passages, two axially spaced fuel manifold rings enveloped within said ring member, a plurality of connecting members in said hollow ring member positioned between and connected to said fuel manifold rings and said hollow ring member, a fuel spray member comprising a radially extending hollow bar communicating with said fuel manifold rings projecting from each of said connecting members into said fuel-air mixing passage and presenting an airfoil shape to the air entering said passage and having apertures in the walls thereof positioned to release fuel at the inlet and substantially the radial center of said fuel-air mixing passage, pipe means providing fuel to said fuel rings and connecting said fuel rings to said second engine case to position the fuel baffle upstream end.

6. A turbofan engine having an axis and comprising an engine fan section, a compressor, a burner section, a turbine section and an afterburner section at the downstream end thereof, a stationary inner body of substantially circular cross section and concentric about said axis projecting rearwardly from said turbine to said afterburner section, a first engine case of substantially circular cross section enveloping said compressor, burner section and turbine section and extending rearwardly to said afterburner section to coact with said inner body to define an annular exhaust gas passage to direct the exhaust gas from said compressor, burner and turbine sections to said afterburner section, a second engine case of substantially circular cross section enveloping said fan section, first engine case and afterburner section and coacting with said first engine case to define an annular bypass passage therebetween connecting said fan section to said afterburner section, a fuel wall of substantially circular cross section concentric with and positioned between said first and second engine cases and coacting with said first and second engine cases to define an annular fuel-air mixing passage and an annular cooling air passage, respectively, each communicating at its upstream end with said bypass passage and at its downstream end with said afterburner section, a hollow ring member attached to, coaxial with and radially aligned with the upstream end of said fuel wall so that said fuel wall extends downstream therefrom and shaped to present an airfoil having an elongated axial dimension and a relatively small radial dimension to the air entering said passages, two axially spaced fuel manifold rings enveloped with said ring member, a plurality of connecting members in said hollow ring member positioned between and connected to said fuel manifold rings and said hollow ring member, a fuel spray member projecting from each of said connecting members into said fuel-air mixing passage and presenting an airfoil shape to the air entering said passage and comprising radially extending hollow bars communicating with said fuel manifold rings and a nozzle having axially rearwardly directed apertures therein positioned to release fuel at the inlet and substantially the radial center of said fuel-air mixing passage, pipe means providing fuel to said fuel rings and connecting said fuel rings to said second engine case to position the fuel baffle upstream end.

References Cited in the file of this patent

UNITED STATES PATENTS

| | | |
|---|---|---|
| 2,482,505 | Pierce | Sept. 20, 1949 |
| 2,580,962 | Sédille | Jan. 1, 1952 |
| 2,602,292 | Buckland | July 8, 1952 |
| 2,610,465 | Imbert et al. | Sept. 16, 1952 |
| 2,632,300 | Brzozowski | Mar. 24, 1953 |
| 2,647,369 | Leduc | Aug. 4, 1953 |
| 2,648,196 | Mullen | Aug. 11, 1953 |
| 2,651,178 | Williams | Sept. 8, 1953 |
| 2,676,461 | Gove | Apr. 27, 1954 |
| 2,679,137 | Probert | May 25, 1954 |
| 2,704,435 | Allen | Mar. 22, 1955 |
| 2,847,821 | Brown | Aug. 19, 1958 |
| 2,861,424 | Jurisich | Nov. 25, 1958 |